US011216318B2

(12) United States Patent
Tuli et al.

(10) Patent No.: US 11,216,318 B2
(45) Date of Patent: Jan. 4, 2022

(54) SYSTEMS, METHODS, AND DEVICES FOR IMPLEMENTING A CENTRAL COMPUTING PLATFORM FOR DISTRIBUTED COMPUTING ENVIRONMENTS

(71) Applicant: SimplrOps, San Jose, CA (US)

(72) Inventors: Mansi Tuli, Dublin, CA (US); Pruthav Joshi, San Jose, CA (US)

(73) Assignee: SIMPLROPS, San Jose, CA (US)

(*) Notice: Subject to any disclaimer, the term of this patent is extended or adjusted under 35 U.S.C. 154(b) by 0 days.

(21) Appl. No.: 16/684,512

(22) Filed: Nov. 14, 2019

(65) Prior Publication Data
US 2020/0151031 A1 May 14, 2020

Related U.S. Application Data

(60) Provisional application No. 62/767,398, filed on Nov. 14, 2018.

(51) Int. Cl.
G06F 9/54 (2006.01)
G06F 16/9538 (2019.01)

(52) U.S. Cl.
CPC .............. G06F 9/541 (2013.01); G06F 9/542 (2013.01); G06F 16/9538 (2019.01)

(58) Field of Classification Search
CPC ....... G06F 9/541; G06F 16/9538; G06F 9/542
See application file for complete search history.

(56) References Cited

U.S. PATENT DOCUMENTS 8,291,490 B1* 10/2012 Ahmed ................. G06F 21/604
726/17
2018/0285884 A1* 10/2018 Long ...................... G06Q 30/01
2018/0293533 A1* 10/2018 Lowry .................... G06F 9/543
2019/0220285 A1* 7/2019 Ali ....................... G06F 9/44505

FOREIGN PATENT DOCUMENTS

WO WO-2016145475 A2 * 9/2016 ......... G06Q 10/0633

OTHER PUBLICATIONS

"Workday Human Capital Management Suite," Retrieved from https://www.workday.com/content/dam/web/au/documents/datasheets/datasheet-workday-human-capital-management-suite-au.pdf, 2014, 5 pages.
Stewart Butterfield, et al., "Slack (software)," Retrieved from https://en.wikipedia.org/wiki/Slack_(software), Aug. 2013, 7 pages.

* cited by examiner

Primary Examiner — Doon Y Chow
Assistant Examiner — Kimberly L Jordan
(74) Attorney, Agent, or Firm — Kwan & Olynick LLP

(57) ABSTRACT

Provided are systems, methods, and devices for implementing a central platform for enterprise applications and software as a service (SaaS). Methods include retrieving, using one or more processors of a central computing platform, one or more update data objects. Methods also include identifying, using the one or more processors, a configuration of a customer portal interface. Methods further include retrieving, using the one or more processors, current configuration data associated with the customer portal interface, the current configuration data characterizing a configuration and settings of an application program interface (API) an instance of application data associated with a distributed application. Methods also include generating, using the one or more processors, one or more custom input data objects based, at least in part, on the current configuration data associated with the customer portal interface.

20 Claims, 12 Drawing Sheets

SYSTEMS, METHODS, AND DEVICES FOR IMPLEMENTING A CENTRAL COMPUTING PLATFORM FOR DISTRIBUTED COMPUTING ENVIRONMENTS

CROSS-REFERENCE TO RELATED APPLICATIONS

This application claims the benefit under 35 U.S.C. § 119(e) of U.S. Provisional Patent Application No. 62/767,398, filed on Nov. 14, 2018, which is incorporated herein by reference in its entirety for all purposes

TECHNICAL FIELD

The present disclosure relates to systems and processes directed to distributed computing environments, and more specifically, to the implementation of a central computing platform for such distributed computing environments.

DESCRIPTION OF RELATED ART

Enterprise applications and software as a service (SaaS) may be software platforms that are configured to provide customers with one or more functionalities directed at services associated with large organizations. Such enterprise applications may be implemented in distributed computational environments. Moreover, such applications may be provided as SaaS in which software is centrally hosted, and functionality of the software is typically provided via a communications network or the internet.

DETAILED DESCRIPTION OF EXAMPLE EMBODIMENTS

Figure 1:
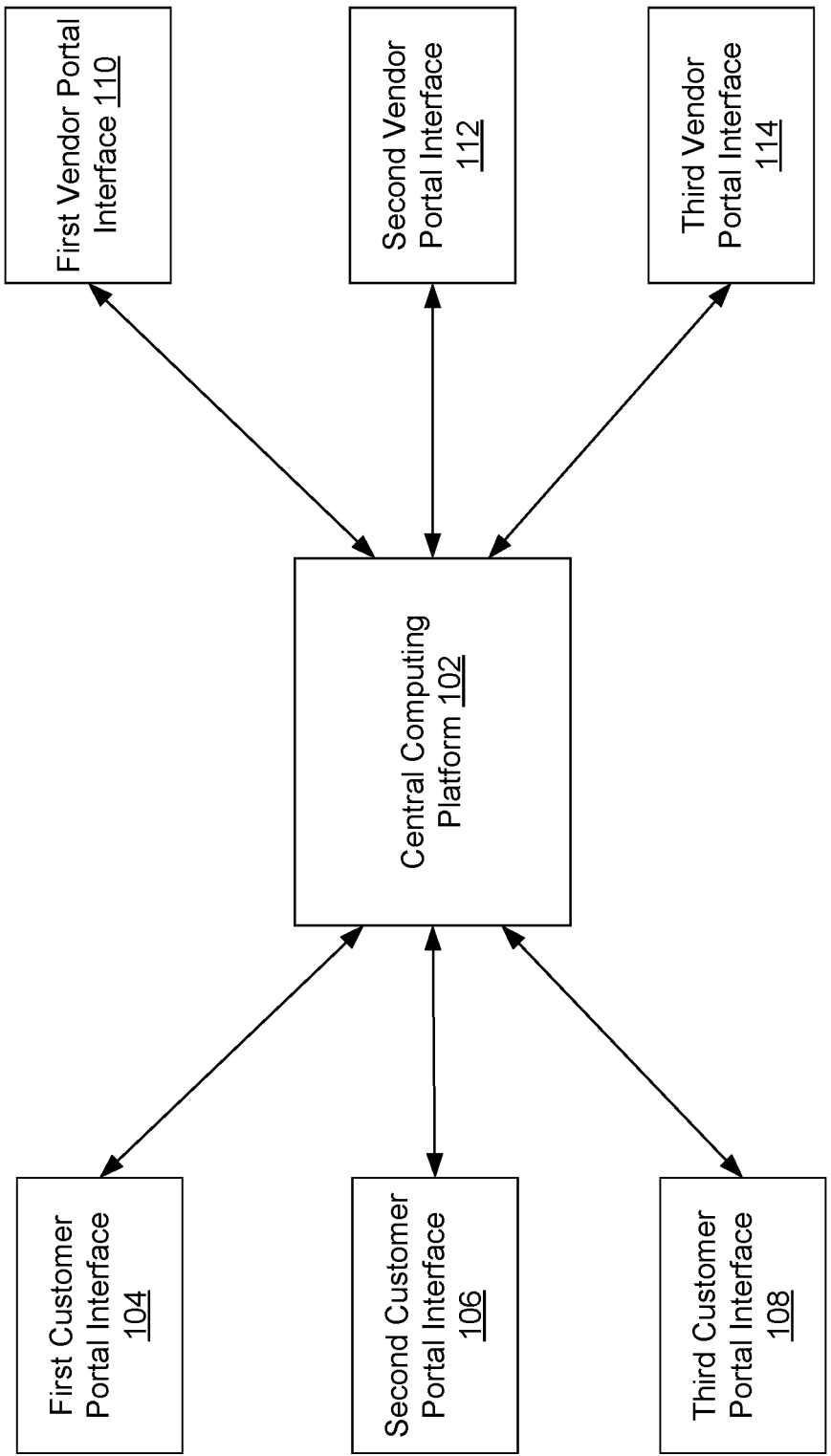
FIG. 1 illustrates an example of a system configured to provide a central platform between multiple customer portals and multiple vendor portals, configured in accordance with some embodiments.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

In various embodiments, various enterprise products may be provided as SaaS products, such as Workday and Slack, in which a SaaS vendor provides a customer with a portal through which to access the SaaS product. As discussed herein, a vendor may be a third party SaaS provider. More specifically, a vendor may be an organization that provides a Human Resources Management System (HRMS), such as Workday. Accordingly, a particular customer may subscribe to multiple SaaS products, and may have portals associated with each one. Thus, the management of each portal, and propagation of changes between the customer and various portals may become so burdensome and processing intensive that it is not practical. Moreover, customers and vendors may be unaware of many updates and configuration changes which may be able to enhance the efficiency of the implementation of such products.

As will be discussed in greater detail below, as described herein, a central processing system may be implemented that manages communication between the customers and vendors to improve the efficiency with which such SaaS products may be provided to multiple customers. Accordingly, the central processing system may provide a vendor portal to vendors and a customer portal to customers, and the central processing system may manage various operations and events, such as communications, updates, and configuration changes. In this way, updates and changes initiated by a customer may be efficiently propagated and implemented across multiple vendor applications, and updates and changes initiated by a vendor may be efficiently propagated to multiple customers. Moreover, the additional updates and configuration changes may be identified by the central processing system to enrich the specific operations included in updates, configuration changes, and integration events that may be associated with such customers.

In various embodiments, SimplrOps is a one of a kind cloud hosted SaaS Product that resolves industry-wide problems related to Workday post-implementation. It leverages rules-based automation and intelligence, and is configured to use and implement machine learning algorithms. A customer portal may be a portal used by SimplrOps' Customers to manage their Workday configuration. A vendor portal may be used by SaaS services, such as Workday services/consulting companies to service their customers. They will access a central computing platform's functions with permissions to view/modify only their customers' data. In various embodiments, a central computing platform may refer to a central intelligent component, cloud hosted, which is used by SimplrOps employees and consultants to create rules for automation, perform analysis, create recommendations, manage customer profiles and administer communication between itself and individual customer portals. In some embodiments, SimplrOps recommendations are guidance objects created after analysis and communicated to customer portals via backend processes.

In some embodiments, workday products/modules are various products of Workday used by customers for which SimplrOps will be supporting their management. E.g. Integrations, Security Groups, Business Rules, HCM, Compensation, Payroll. As disclosed herein, updates are functionality updates performed by SaaS products like Workday every so often, so as to keep their customers' configuration up-to-date. For Workday, they come in three forms: 1) Bi-annual feature releases 2) Weekly Service Updates 3) Ad-hoc Customer Alerts.

As will be discussed in greater detail below, a central computing platform provided by, for example, SimplrOps would automate support for customers who use a vendor system like Workday. As disclosed herein, a vendor system may refer to a computational environment of a vendor, such as the application servers operated and maintained by the vendor to support an SaaS application, such as Workday. The central computing platform is configured to integrate using application program interfaces (APIs) to a customer's vendor system, retrieve and store relevant data, and intelligently automate various functionalities for customers. In various embodiments, HRMS systems that are communicatively coupled with the central computing platform are cloud-based software systems that customers (and users) may access via a website that includes a portal interface.

In various embodiments, SimplrOps customers and users described herein may be entities and organizations, such as companies, using SimplrOps that are represented as Customers, and the users within such company are referenced as users. In some embodiments, retrieve refers to a retrieve operation or process of connecting to the customer's tenant (e.g. Production tenant of Workday for a customer XYZ) and using their APIs to bring the data into a central platform, such as SimplrOps, environment. There can be inbound (retrieve) and outbound (update) communication to the customer's Product tenant. In some embodiments, business rules may refer to rules implemented via SimplrOps UI to automate repeatable actions within the system. Such rules may be user defined, or automatically and/or intelligently generated.

As will be discussed in greater detail below, various embodiments disclosed herein are configured to provide automation of expansive and dynamic support processes for SaaS applications, reducing dependency on human intervention, this assisting customers in implementing decisions and reducing the overhead of doing so. In various embodiments, the logic and rules for automation are generated by the central computing platform, and then used repeatably by various customers. As will also be discussed in greater detail below, customers are also allowed to create their own specific rules for automation.

As will also be discussed in greater detail below, the implementation of rules and automation facilitate the implementation of security measures across various different instances of an application as well as portals associated with an application. In various embodiments, only configuration data is used. Accordingly, the personal information of users is not utilized is kept secure.

FIG. 1 illustrates an example of a system configured to provide a central platform between multiple customer portals and multiple vendor portals, configured in accordance with some embodiments. As will be discussed in greater detail below, customers may be organizations, and may have users of software applications or software platforms that are configured and implemented in a first computational environment that includes customer portal interfaces, such as first customer portal interface 104, second customer portal interface 106, and third customer portal interface 108. As disclosed herein, a portal interface may be a web-based or web-accessible entity, such as a webpage that may include an API, that is communicatively coupled to one or more application servers used to host distributed applications such as SaaS applications. In various embodiments, the portal interfaces may be accessible via a communications network, such as the internet, and may be implemented using MEAN stack and application program interfaces. In various embodiments, customers may access portals using secure credentials.

In various embodiments, such customers may utilize the services of other software applications provided by vendors which may be implemented in a second computational environment that includes vendor portal interfaces, such as first vendor portal interface 110, second vendor portal interface 112, and third vendor portal interface 114. Accordingly, customer and vendor portals may be implemented and configured to provide an interface between the two computational environments, and enable the utilization of the vendor's application by the customer.

As will be discussed in greater detail below, systems described herein, such as system 100 further include a central computing platform, such as central computing platform 102, that is configured to intelligently manage the interactions between the portals to ensure that connectivity and functionality of such portals is maintained. While FIG. 1 illustrates one instance of central computing platform 102, it will be appreciated that multiple instances of central computing platforms may be implemented.

As discussed above, system 100 includes several vendor portals, which may be Software as a Service (SaaS) portals associated with various different SaaS or enterprise applications. Accordingly, first vendor portal interface 110 may be configured to provide access to a first enterprise application, and second vendor portal interface 112 may be configured to provide access to a second enterprise application, and third vendor portal interface 114 may be configured to provide access to a third enterprise application. In some embodiments, multiple vendor portals may be associated with a single enterprise application. In this way, multiple vendors may each have their own portal to the enterprise application. As shown in FIG. 1, any number of vendor portals may be included.

As discussed above, system 100 may also include various customer portals which may be configured to provide a customer with access to a particular vendor portal. Accordingly, a customer may be utilizing a first platform that is a first computational environment that is different from a platform and computational environment of the enterprise application associated with the vendor portal. In various embodiments, a platform and/or computational environment may refer to a particular type of application used, a file system, a computational architecture, or any combination thereof. In various embodiments, each customer portal and vendor portal is a unique instance of its associated application.

As discussed above, system 100 may include central computing platform 102 that is configured to observe and manage interactions between the customer and vendor portal interfaces. As will be discussed in greater detail below, central computing platform 102 may be configured to generate and provide recommendations for customer portal interfaces and/or vendor portal interfaces, and may also be configured to implement one or more changes to the customer portal interfaces and/or vendor portal interfaces. For example, central computing platform 102 may be configured to manage integrations, manage customer profiles, manage updates, generate notifications, and generate recommendations for a customer portal interface and/or vendor portal interface to enhance the interaction between the customer portal and the vendor portal, as well as enhance the functionality of the portals themselves. It will be appreciated that while reference may be made herein to a particular application module, such as an integrations module, any suitable application module may be utilized.

Figure 2:
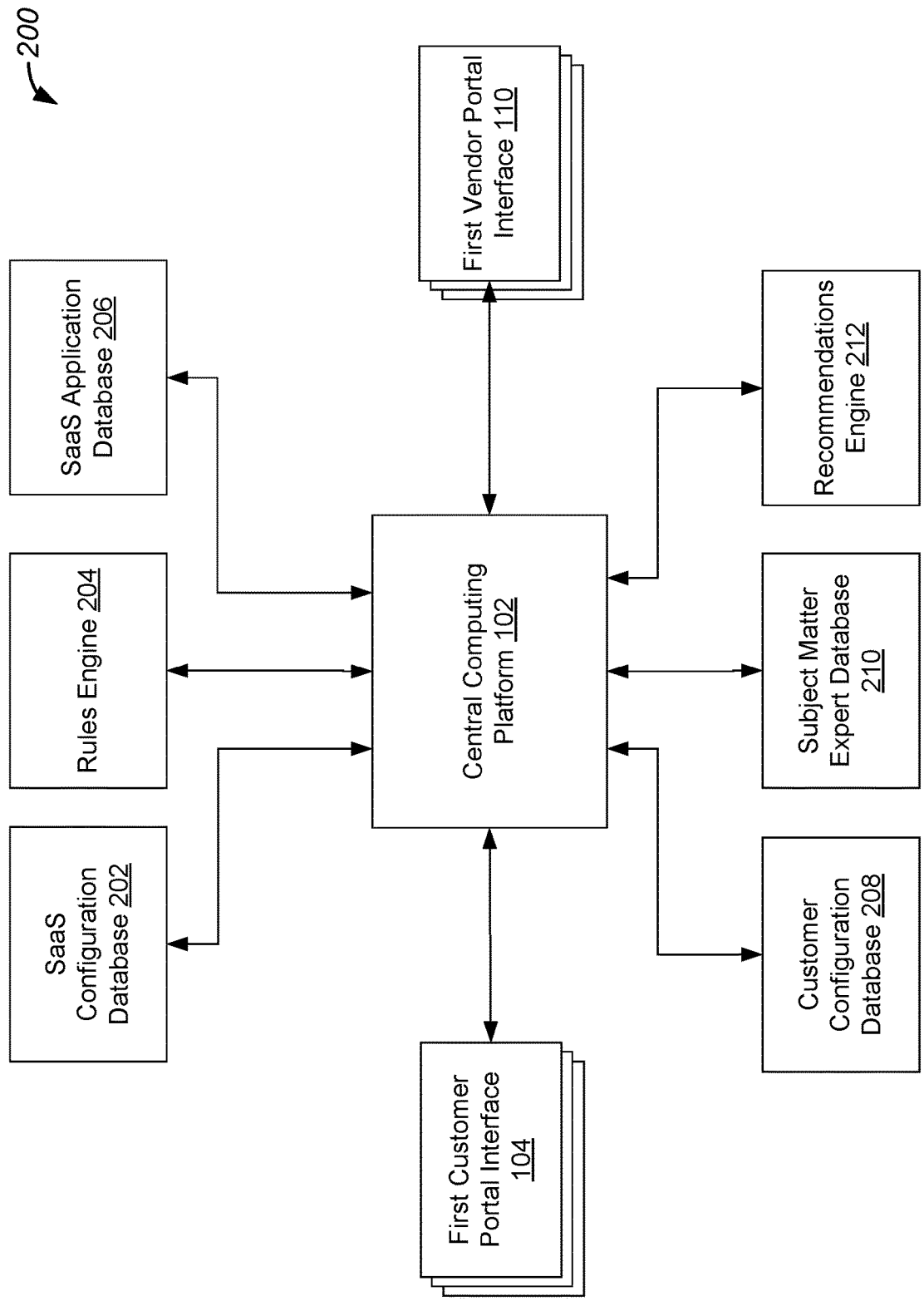
FIG. 2 illustrates another example of a system configured to provide a central platform between multiple customer portals and multiple vendor portals, configured in accordance with some embodiments.

FIG. 2 illustrates another example of a system configured to provide a central platform between multiple customer portals and multiple vendor portals, configured in accordance with some embodiments. As discussed above, a system, such as system 200, may include customer portal interfaces, such as first customer portal interface 104, vendor portals, such as first vendor portal interface 110, and central computing platform 102. As shown in FIG. 2, central computing platform 102 is configured to observe and capture various types of data, and is further configured to utilize such data to generate notifications and recommendations, as well as implement configurations of the portals. As will be discussed in greater detail below, the implementation of modifications of the configurations of such portals may be implemented in an automatic and intelligent manner to greatly increase the efficiency with which distributed applications, such as SaaS applications, are implemented.

In various embodiments, FIG. 2 illustrates various inputs captured by central computing platform 102. In some embodiments, central computing platform 102 is communicatively coupled to one or more database systems, and is configured to identify and retrieve relevant data that pertains to the implementation of distributed applications. For example, central computing platform 102 is communicatively coupled to SaaS configuration database 202 which may include configuration data associated with distributed applications, such as specific configurations of distributed application products. In various embodiments, central computing platform 102 may also be communicatively coupled to SaaS application database 206 which may be configured to store existing SaaS information relating to planned release data, service updates, as well as ad-hoc customer alerts.

In various embodiment, central computing platform 102 is also configured to monitor communications and interactions between portals, and to capture and store data about customer portals, such as utilization of customer products and integrations. In various embodiments, such data may be stored as part of configuration data that is maintained in customer configuration database 208. Moreover, central computing platform 102 also captures and stores existing rules that have been generated for automation. In one example, such existing rules may be stored in a rules engine, such as rules engine 204. Central computing platform 102 is also configured to capture and store data associated with vendor portals and applications, such as planned release data, service updates, as well as ad-hoc customer alerts.

FIG. 2 further illustrates various outputs generated by central computing platform 102. For example, central computing platform 102 may implement one or more filters associated with updates implemented on a customer portal. Central computing platform 102 may also be communicatively coupled to subject matter expert database 201 which is configured to store information provided by a subject matter expert. In some embodiments, central computing platform 102 is configured to generate a prompt for a subject matter expert to provide input. In some embodiments, central computing platform 102 may also be communicatively coupled to recommendations engine 212 which may be configured to utilize the previously described data to generate one or more recommendations, such as an impact analysis, a list of recommended tasks or a proposed plan, and an identification of impacted integrations.

As will be discussed in greater detail below, the vast amount of data captured by central computing platform 102 as well as the utilization of such data may provide the customer portals and vendor portals with extensive visibility of various recommendations and configurations they might not otherwise contemplate. Furthermore, while SaaS configuration database 202, rules engine 204, SaaS application database 206, customer configuration database 208, subject matter expert database 210, and recommendations engine 212 have been shown outside of central computing platform 102, such illustration is shown for clarity and is not intended to be limiting. For example, any of these components may be integrated with central computing platform 102, and implemented as part of central computing platform 102.

Figure 3:
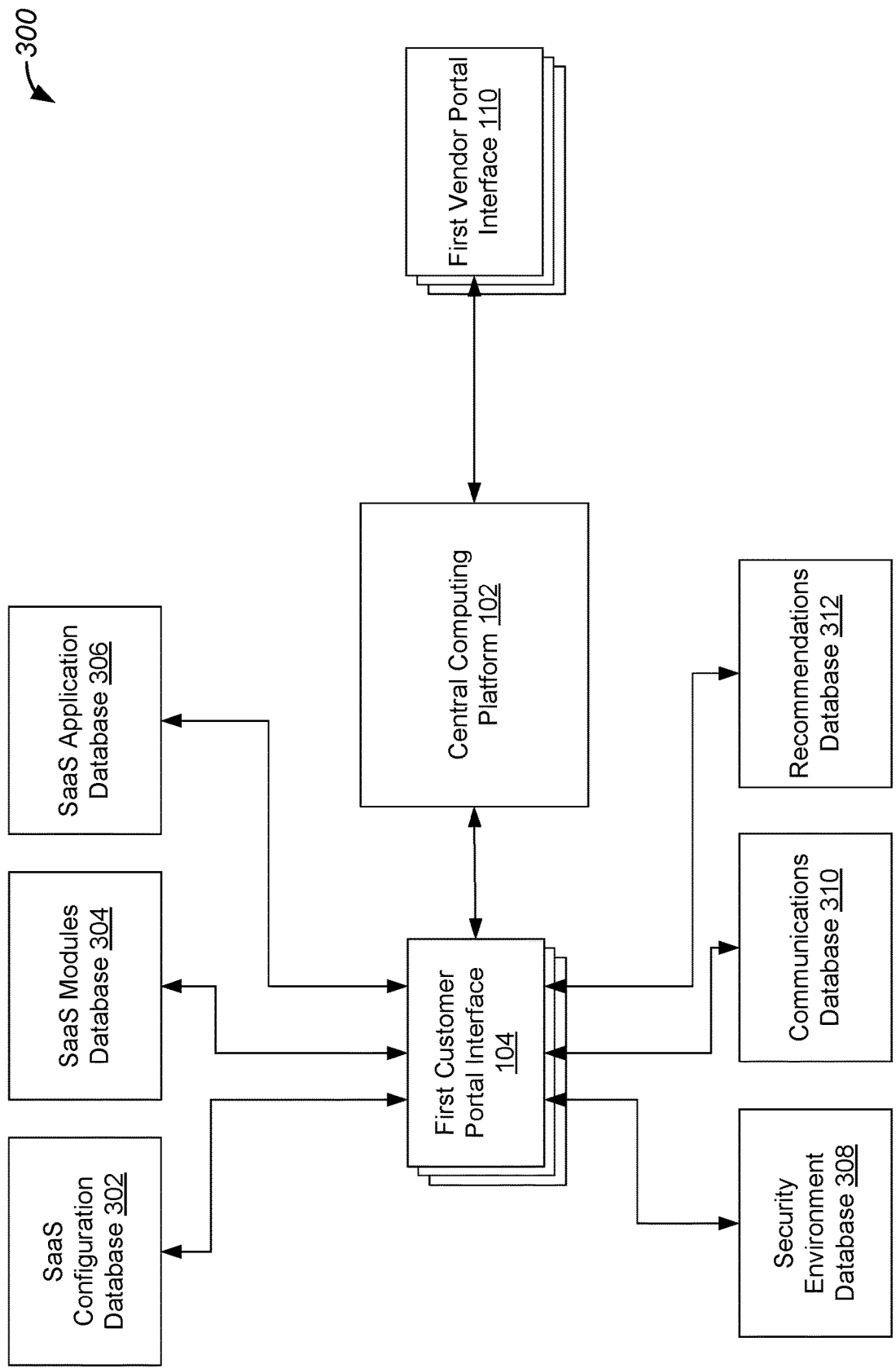
FIG. 3 illustrates yet another example of a system configured to provide a central platform between multiple customer portals and multiple vendor portals, configured in accordance with some embodiments.

FIG. 3 illustrates yet another example of a system configured to provide a central platform between multiple customer portals and multiple vendor portals, configured in accordance with some embodiments. As discussed above, a system, such as system 300, may include customer portals, such as first customer portal interface 104, vendor portals, such as first vendor portal interface, and central computing platform, such as central computing platform 102. As shown in FIG. 3, a customer portal interface, such as first customer portal interface, 104, is configured to implement various functionalities associated with a customer platform, as well as at least one associated vendor platform.

In one example, first customer portal interface 104 may be configured to implement various functionalities associated with its native computational environment. More specifically, first customer portal interface 104 may handle administrative management of local users and security, and in this way, may have access to various data of the customer's computational environment. In some embodiments, the computational environment of first customer portal interface 104 may include various user data, such as user profiles with associated user identifiers stored in a format determined based on the computational environment of the customer portal.

First customer portal interface 104 may also be configured to communicate with central computing platform 102, and may communicate with first vendor portal interface 110 via central computing platform 102. For example, first customer portal interface 104 may be configured to communicate with central computing platform 102, implement recommendations generated by central computing platform 102, and implement relevant vendor product updates managed by central computing platform 102.

First customer portal interface 104 may be further configured to implement various vendor application related functionalities and store data associated with such functionalities, such as vendor product configurations, integrations with vendor products, implementations of plans associated with such vendor products, and integration production runtime events. In some embodiments, such functionalities may be implemented via central computing platform 102. In various embodiments, central computing platform 102 may enable direct communication between the customer portal and the vendor portal in a pass-through mode.

In various embodiments, first customer portal interface 104 may be coupled to various other system components as well. For example, first customer portal interface 104 may be coupled to an instance of SaaS configuration database 302, SaaS modules database 304, and SaaS application database 306 which may be configured to store configuration data, module information, and application data respectively, where each is specific to the instance of first customer portal interface 104. Moreover, first customer portal interface 104 may also be communicatively coupled with security environment database 308 which may be configured to store and manage various security and access rules, as well as manage sensitive information such as user data. First customer portal interface 104 may also be communicatively coupled with communications database 310 which may be configured to monitor and log communications with other system components such as central computing platform 102 and first vendor portal interface 110. Furthermore, first customer portal interface 104 may be communicatively coupled to recommendations database 312 which may be configured to store recommendations that may be received from another system component, such as central computing platform 102.

Figure 4:
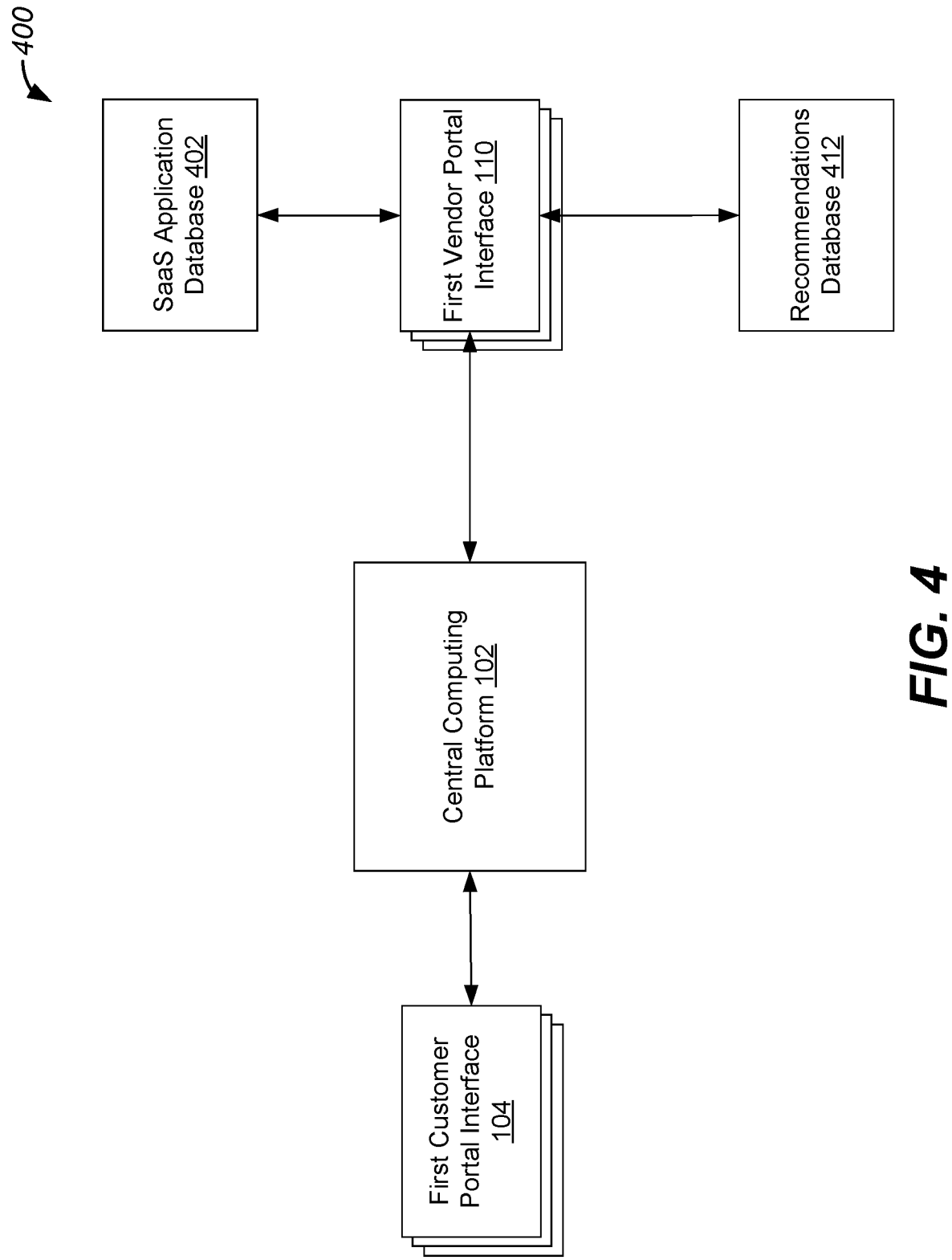
FIG. 4 illustrates an additional example of a system configured to provide a central platform between multiple customer portals and multiple vendor portals, configured in accordance with some embodiments.

FIG. 4 illustrates an additional example of a system configured to provide a central platform between multiple customer portals and multiple vendor portals, configured in accordance with some embodiments. As discussed above, a system, such as system 400, may include customer portal interfaces, such as first customer portal interface 104, vendor portals, such as first vendor portal interface 110, and central computing platform 102. As shown in FIG. 4, first vendor portal interface 110 is configured to implement various functionalities associated with a vendor platform.

In various embodiments, first vendor portal interface 110 is configured to pull various source data from the vendor's computational environment used to implement the vendor's enterprise application. Such source data may include planned release data, service updates, and ad-hoc customer alerts. In various embodiments, the data may be retrieved from a database system that may be specific to the instance of first vendor portal interface 110, such as SaaS application database 402. The vendor portal may also provide one or more recommendations, such as a detailed impact analysis, a list of tasks or an associated plan, and an identification of impacted integrations. In various embodiments, such recommendations may be stored in an instance of recommendations database 412. As discussed above, such outputs may be provided to central computing platform 102 as inputs, and central computing platform 102 may provide first customer portal interface 104 with recommendations based on such inputs as well as one or more other parameters, as will be discussed in greater detail below.

In various embodiments, Workday related functions implemented by one or more of the customer portals and vendor portals may include functions and operations associated with integrations and integrations event management such as: retrieve integrations, integrations hierarchy and runtime events from Workday; visual representation: grid and calendar; compare integrations; and integrations versioning. Also included may be functions and operations associated with retrieve and manage security groups, business processes, and more, such as: retrieve and manage; versioning; comparing data between two tenants; and visual representation. They may further include functions and operations associated with Workday updates and planning such as: view all Workday updates as published by central computing platform 102, that will be shown as relevant v/s non-relevant to the customer; and accept recommendations as published by central computing platform 102.

In various embodiments, general functions implemented by one or more of the customer portals and vendor portals may include task planning; administration of users, permissions, customer, and environment; dashboards and reporting; navigation; dual authentication (OTP and user id/password) for login; session timeout and logout; and requests and notifications for communication between users and subject matter experts.

Figure 5:
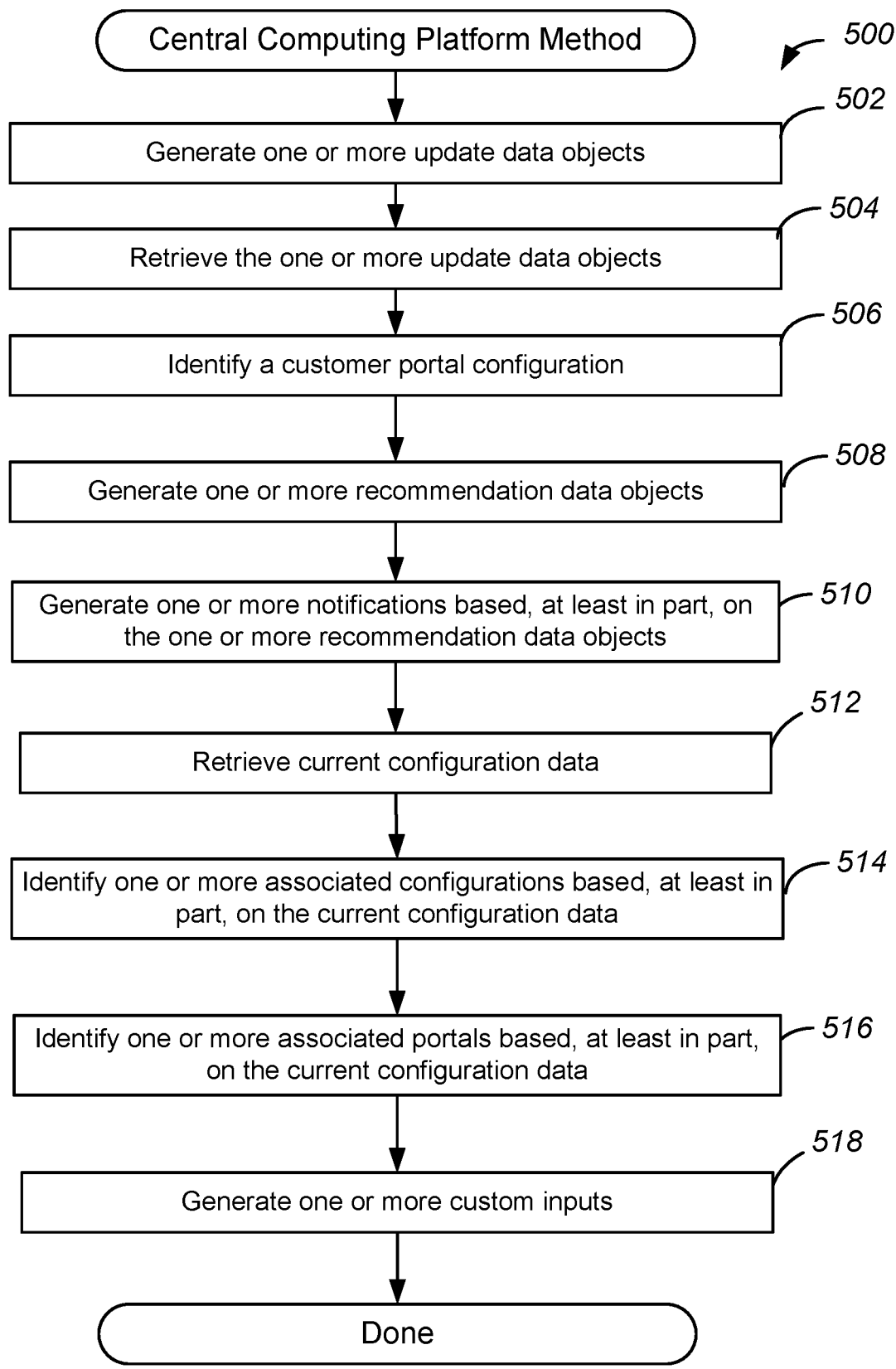
FIG. 5 illustrates an example of a flow chart of a method for implementing update events, implemented in accordance with some embodiments.

FIG. 5 illustrates an example of a flow chart of a method for implementing update events, implemented in accordance with some embodiments. As will be discussed in greater detail below, a central computing platform may be configured to implement a method, such as method 500 described below, in which one or more update data objects may be identified and retrieved, and automatically deployed across multiple different instances of portals. In this way, the identification and implementation of update data objects may be implemented across multiple different heterogenous customer and vendor portals without the utilization of manual intervention or additional overhead.

Accordingly, method 500 may commence with operation 502 during which one or more update data objects may be generated. In various embodiments, the update data objects may be generated by a product vendor, and may include one or more updates or upgrades associated with a particular enterprise application. As similarly discussed above, the update data objects may be generated by one or more entities associated with a product vendor, and may thus be stored in one or more of various different data resources.

Method 500 may proceed to operation 504 during which the one or more update data objects may be retrieved. In various embodiments, a system component, such as the central computing platform, identifies and retrieves the update data objects from various different data sources. For example, the various data sources may be different websites, different databases, and different data storage locations operated and maintained by the vendor. In some embodiments, the update data objects are identified and retrieved using a custom-built API which may be specifically configured to identify and retrieve such update data objects. Furthermore, the update data objects may be stored by the central computing platform in a database system.

Method 500 may proceed to operation 506 during which a customer portal configuration is identified. Accordingly, updated configuration data for a customer in their vendor environment may be identified based on information provided by the vendors. In various embodiments, configuration data is generated by a customer's vendor system which may include various specific instances of customer portal interfaces and vendor portal interfaces which, as discussed above, may be coupled to a cloud-based Human Resources Management System (HRMS). In one example, such a HRMS computational environment may be used for housing customer's data such as personnel information, benefits, payroll, vacation, time-tracking, time-off, and other information. In various embodiments, configuration data and attributes may include various settings and state data associated with the specific implementation of modules within the HRMS computational environment. Accordingly, such configuration data may be imported from these systems by the central computing platform. However, in some embodiments, personal data is not.

Method 500 may proceed to operation 508 during which one or more recommendation data objects may be generated. Accordingly, a central computing platform may generate one or more recommendations based on the updated configuration data described above, and may package the recommendations in a recommendation data object. In various embodiments, the recommendation data object may include a data structure configured to store one or more data values describing operations to be implemented based on the updated configuration. For example, the recommendation data object may include a list of tasks required to implement changes to support the vendor's product updates. In one example, specific aspects of the impacted configurations may be mapped to tasks that may be identified by task identifiers, and the recommendation data object may be updated to include the task identifiers. In another example, a recommendation data object may identify if any specific testing operations would be required for the updated configuration and to what extent. Furthermore, it may be determined if the updated configuration is affecting any other configurations, such as previous configurations. For example, data object dependencies may exist based on prior updates, and a recommendation data object may be configured to include data to resolve such dependencies.

Method 500 may proceed to operation 510 during which one or more notifications may be generated. In various embodiments, notifications may be generated that are configured based on the recommendation data object and the configurations of the customer portals. Accordingly, a specific notification may be generated and sent to each customer portal, and each notification may be customized for its associated customer portal.

Method 500 may proceed to operation 512 during which current configuration data may be retrieved. Accordingly, a system component, such as the central computing platform, may retrieve current state and configuration data. As discussed above, the current configuration data may include various settings and state data associated with the specific implementation of the portal and application. Accordingly, during operation 512, the current configuration data characterizing a configuration and settings of an API and an instance of application data associated with a distributed application may be retrieved.

Method 500 may proceed to operation 514 during which one or more impacted configurations are identified based on a comparison of the updated configuration data and the current configuration data. Accordingly, specific components of a customer's configuration may be identified, and more specifically, specific components of each instance of a customer portal may be identified. In some embodiments, a component may be a specific module, user interface element, configuration setting, application setting, or any other aspect of a customer portal.

Method 500 may proceed to operation 516 during which one or more impacted portals may be identified. In various embodiments, the impacted portals may be additional portals and/or components of portals that may be integrated with one of the above customer portals. As discussed above, a vendor portal interface may be coupled to an HRMS computational environment associated application like Workday. In various embodiments, the impacted portals may be additional portals and/or components of portals that may be integrated with one of the above customer's portals. For example, the impacted portals may be customer's vendor portals that are integrated with the customer's impacted customer portals. In various embodiments, such integration may be implemented using APIs coupled to the different customer and vendor computational environments, and may enable the retrieval and storage of relevant data and application of the automation of identification of modifications and changes of vendor portal interfaces as well as any updates to be made to the vendor portals interfaces.

Method 500 may proceed to operation 518 during which one or more custom inputs may be generated. In various embodiments, a custom input may be a custom input data object that is generated based on the impacted configurations and impacted portals discussed above. Accordingly, each custom input is configured to provide a unique input through which a user may implement one or more actions and/or operations based on the above described recommendations. In some embodiments, a custom input may be a custom user interface object. Furthermore, the custom inputs may be configured to implement one or more functionalities, such as testing, accepting, rejecting, and/or postponing for a designated amount of time. In various embodiments, an additional data object, such as a backlog, is also generated that includes status information identifying a set of parameters corresponding to a future condition so that a customer can revisit and implement a recommendation in future the future as appropriate.

Figure 6:
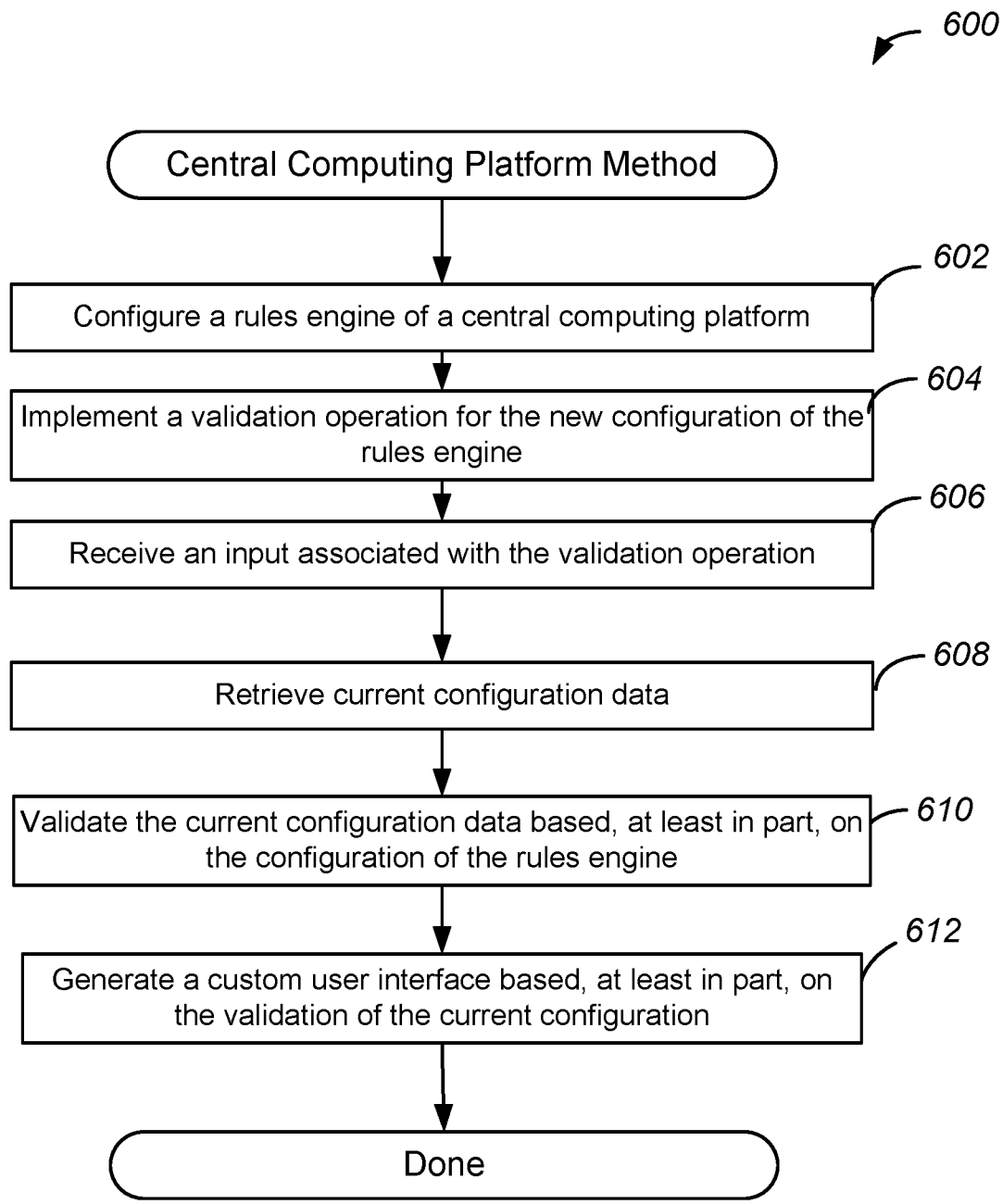
FIG. 6 illustrates an example of a flow chart of a method for implementing configuration validation events, implemented in accordance with some embodiments.

FIG. 6 illustrates an example of a flow chart of a method for implementing configuration validation events, implemented in accordance with some embodiments. As will be discussed in greater detail below, a central computing platform may be configured to implement a method, such as method 600 described below, in which configuration data may be retrieved and validated, and specific improvements may be identified and implemented without the utilization of manual intervention or undue overhead.

Accordingly, method 600 may commence with operation 602 during which a rules engine of a computing platform may be configured. In various embodiments, the rules engine may be configured to implement core logic and rules that enable the computing platform to determine a data structure format and system utilized by vendors. Moreover, the computing platform may be further configured to define rating scales based on specific types of conditions as well as provide the ability to generate visual representations that may be utilized in associated with vendor portals. In some embodiments, the computing platform is also configured to receive specific recommendations for particular and specific conditions and scenarios. Accordingly, a computing platform, as well as a rules engine included in the computing platform, may be configured to implement core logic that enables the communication and interaction with various components of a vendor's system and a customer's system. During operation 602, one or more rules may be received and stored in the rules engine.

Method 600 may proceed to operation 604 during which the rules engine may be validated. Accordingly, one or more rules in the rules engine may be tested to determine if the rule is valid or not. In various embodiments, the central computing platform is configured to pull the latest configuration from a vendor system and assesses the quality of the configuration and events by matching the configuration against the rules, and hence validating if the rules validly apply to each configuration. As discussed above with reference to operation 602, the rules are created in central computing platform and are widely available to any customer portal.

Method 600 may proceed to operation 606 during which an input may be received. In various embodiments, the input may indicate that a system validation operation should be implemented. For example, a user may indicate that one or more components of a customer's system, such as its configuration should be tested and validated to see if any improvements can be made to the configuration. Accordingly, during operation 606, an input may be received indicating that such testing should be implemented.

Method 600 may proceed to operation 608 during which current configuration data may be retrieved. Accordingly, a system component, such as the central computing platform, may retrieve current state and configuration data. As similarly discussed above, configuration data and attributes may include various settings and state data associated with the specific implementation of modules within the HRMS computational environment. Accordingly, such configuration data may be imported from these systems by the central computing platform.

Method 600 may proceed to operation 610 during which the current configuration data is validated based, at least in part, on the rules engine. Accordingly, the computing platform may analyze the retrieved configuration data, and may generate one or more recommendations based on the analysis. In various embodiments, the analysis may be implemented by testing the current configuration based on the rules stored in the rules engine. In various embodiments, logic represented in the rules engine is applied to the configuration data and attributes to determine if the current configuration is compatible with one or more criteria, such as a current industry standard. Additionally, one or more recommendations may be generated based on identified improvements in the retrieved configuration, and performance metrics may be generated for each recommendation that identify one or more aspects of the identified improvements, such as a specific increase in performance.

Method 600 may proceed to operation 612 during which a custom user interface may be generated. In various embodiments, the custom user interface is configured to include user interface elements corresponding to the recommendations described above as well as the improvements and their associated performance metrics. In one example, a graphical representation may be generated provides a graphical representation of the recommendations and improvements. In some embodiments, the graphical representation may be a user interface screen that is capable of being presented to a user on a display device.

Figure 7:
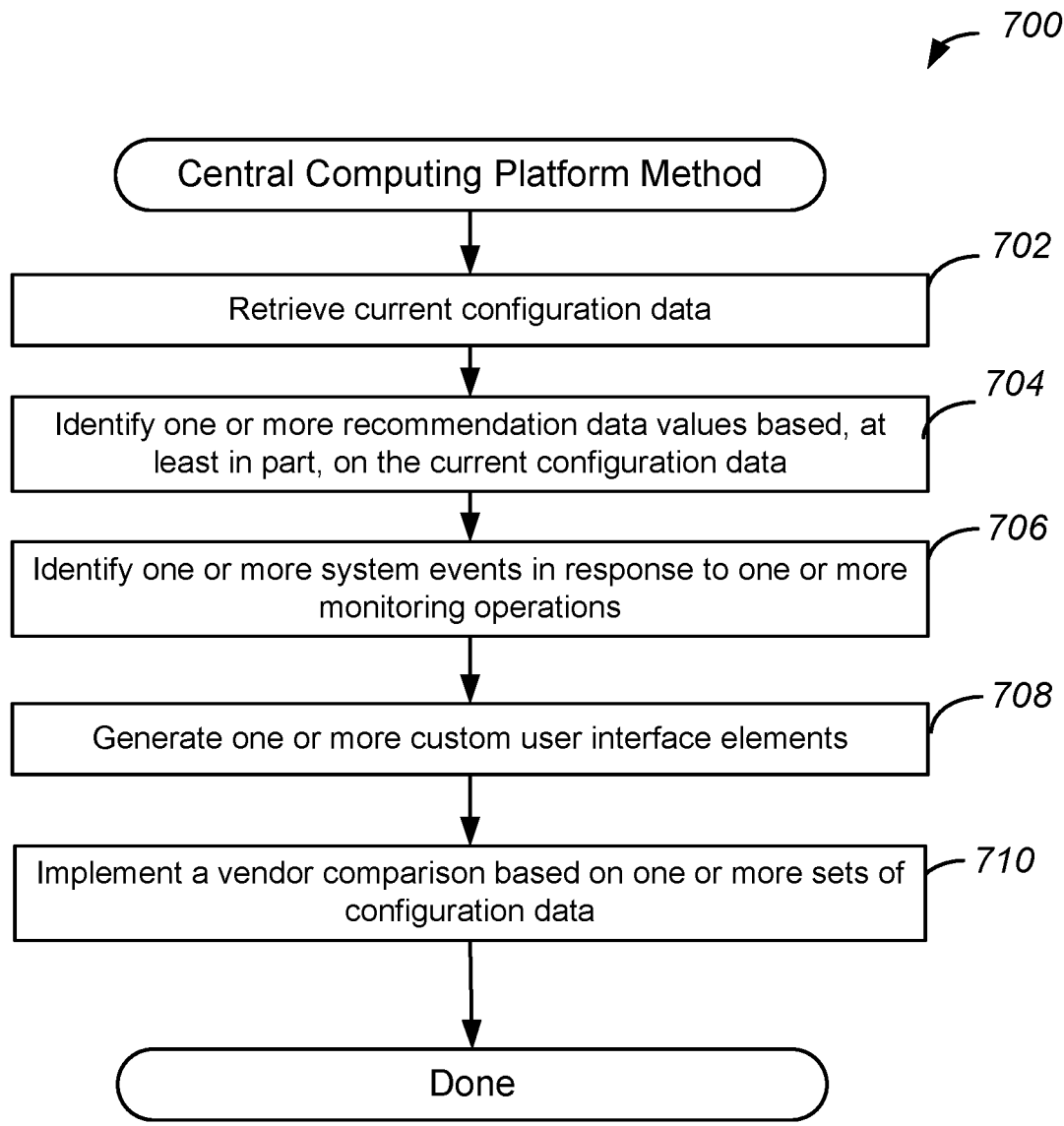
FIG. 7 illustrates an example of a flow chart of a method for monitoring system events, implemented in accordance with some embodiments.

FIG. 7 illustrates an example of a flow chart of a method for monitoring system events, implemented in accordance with some embodiments. As will be discussed in greater detail below, a central computing platform may be configured to implement a method, such as method 700 described below, in which a system may be monitored such that system events are dynamically identified and detected, and specific actions may be identified and implemented without the utilization of manual intervention or undue overhead.

Accordingly, method 700 may commence with operation 702 during which current configuration data may be retrieved. Accordingly, a system component, such as the central computing platform, may retrieve current state and configuration data. As similarly discussed above, configuration data and attributes may include various settings and state data associated with the specific implementation of modules within the HRMS computational environment. Accordingly, such configuration data may be imported from these systems by the central computing platform.

Method 700 may proceed to operation 704 during which one or more recommendations may be automatically identified. Accordingly, once the configuration data has been retrieved during operation 702, the central computing platform may continuously check for updates to the configuration. Moreover, in response to identifying an update, the central computing platform may perform a comparison on the update, check a version of the updates, and generate auto-recommendations to improve the configuration, as discussed above. In some embodiments, the automatic generation of recommendations may be responsive to the importation and retrieval of the configuration data. Accordingly, one or more monitoring operations and processes may be implemented automatically and concurrently with other operations and processes, such as methods 500 and 600 discussed above. In various embodiments, when monitoring the configuration data as described above, the central computing platform may periodically generate results that may be displayed in a user interface, or storable or printable in a particular format.

Method 700 may proceed to operation 706 during which one or more system events or conditions may be identified based on the monitoring. For example, particular system events, that may be identified based on event identifiers, may be detected, and one or more messages may be generated. More specifically, a system event may be an error, a failure, an exception, or a warning. In various embodiments, during operation 706, the central computing platform may identify such events and automatically generate and send messages to notify a user that such events have occurred.

Method 700 may proceed to operation 708 during which one or more custom user interface elements may be generated. In some embodiments, the central computing platform is configured to enable searching within all configuration data that has been imported to a customer's portals via the customer's API. In various embodiments, such searching may be implementing using a user interface element that is customized based on the customer's API to enable searching and querying via the user interface, and also provide results via the user interface. The searching may be implemented using query terms, such as keywords entered into the user interface element. In various embodiments, the results may be displayed from all configurations. Furthermore, the search implemented by the central computing platform may identify a position and/or attribute of a configuration where the query term appears.

Method 700 may proceed to operation 710 during which a vendor comparison may be implemented. In various embodiments, the central computing platform is coupled to and configured for a particular customer based on multiple different vendor portals associated with a vendor's system. In various embodiments, a vendor may supply more than one vendor portal interface to a customer, and configuration attributes in the different systems utilizing the different portals have different configuration data and different settings. Accordingly, the central computing platform may be configured to compare a particular customer's specific configuration data from two different vendor portals, and further configured to identify and highlight the differences, and enable the synchronization of such differences. In various embodiments, a custom user interface may be generated to allow such synchronization. Moreover, the central computing platform may be configured to generate one or more recommendations based on such a comparison. In this way, the central computing platform may compare configurations across different vendors, and provide a user with a unified view across vendors.

Figure 8:
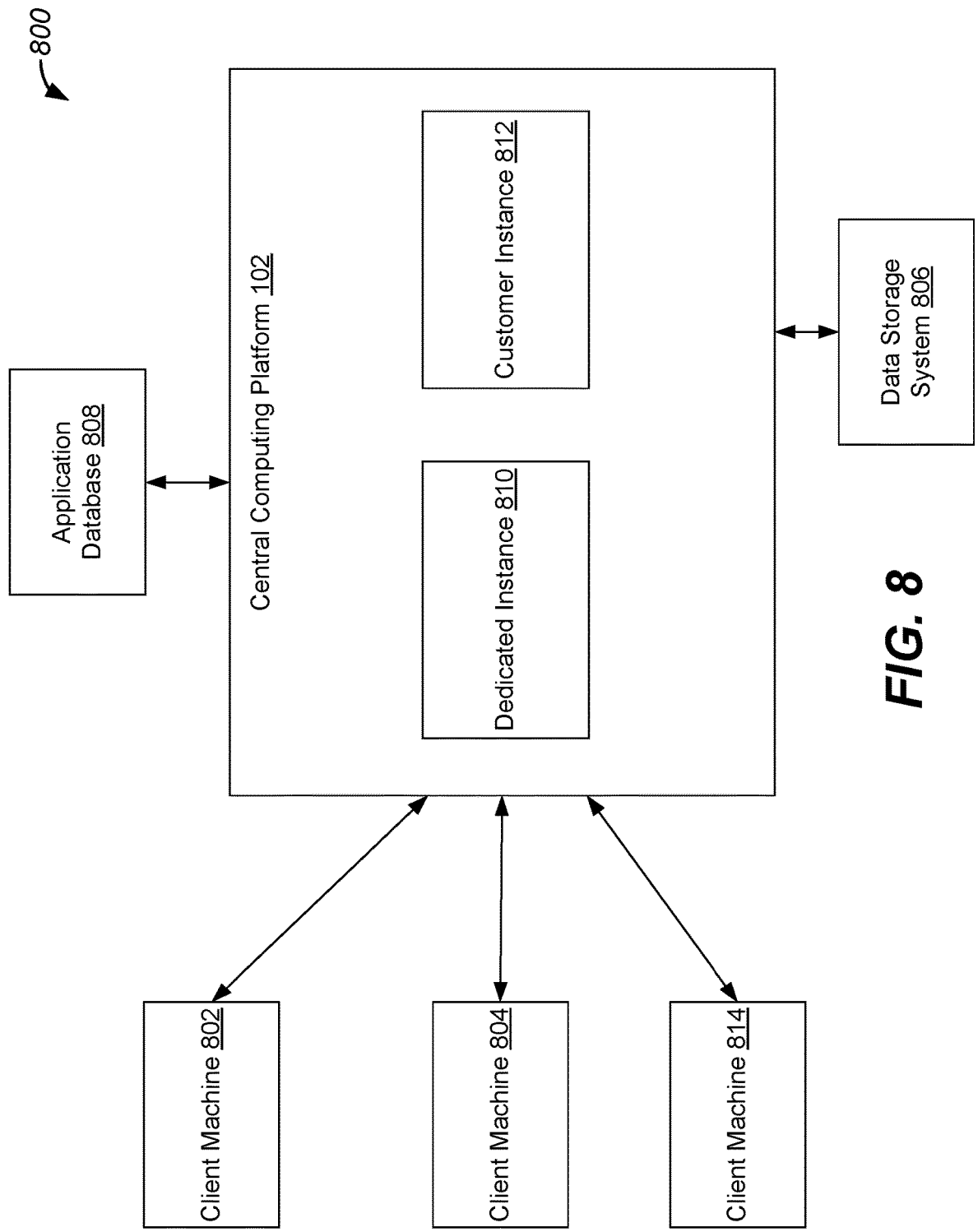
FIG. 8 illustrates an example of a system configured to implement various embodiments disclosed herein.

FIG. 8 illustrates an example of a system configured to implement various embodiments disclosed herein. As shown in FIG. 8, a system, such as system 800 may include multiple client machines coupled to one or more system components via a communications network, such as the Internet. For example, client machine 802, client machine 804, and client machine 814 may be coupled to central computing platform 102. In various embodiments, the client machines may be used by users and may be used to instantiate customer portal interfaces.

In various embodiments, system 800 further includes one or more scalable resources implemented in a cloud-based environment. Such resources may be configured to implement various operations described above as well as operations such as data fetching, event triggering, data query management, configuration and management of application program interfaces (APIs) associated with the portals described above, as well as security and authentication operations associated with such portals. In various embodiments, such scalable resources may be implemented in a dedicated instance of a Ubuntu framework, such as dedicated instance 810.

As shown in FIG. 8, various instances of portals may be implemented for particular users, such as customers, and may be implemented in a secure and scalable manner. For example, an instance of a portal may be instantiated for a customer, and such an instance may be coupled to an instance of scalable resources included central computing platform 102, such as customer instance 812. The instance of the portal may be configured specifically for the customer as well as their utilization/interaction with a particular SaaS application.

In some embodiments, the system may further include a data storage system, such as data storage system 806, which is configured to store data utilized by computing platform 102, and is configured to communicate with other system components described above. In various embodiments, data storage system 806 may be implemented in a scalable manner and managed by central computing platform 102 described above. In various embodiments, data storage system 806 is implemented as a distributed file system.

According to some embodiments, the system components may also be coupled to resources associated with a SaaS application, such as application database 808. As noted above, such coupling may be managed by the central platform via the instantiated components described above. In various embodiments, such system components may also be communicatively coupled to additional users, which may be consultants, subject matter experts, or other entities such as members of a team, such as a SimplrOps team. Such communicative coupling may be implemented via a communications network, such as the Internet.

Figure 9:
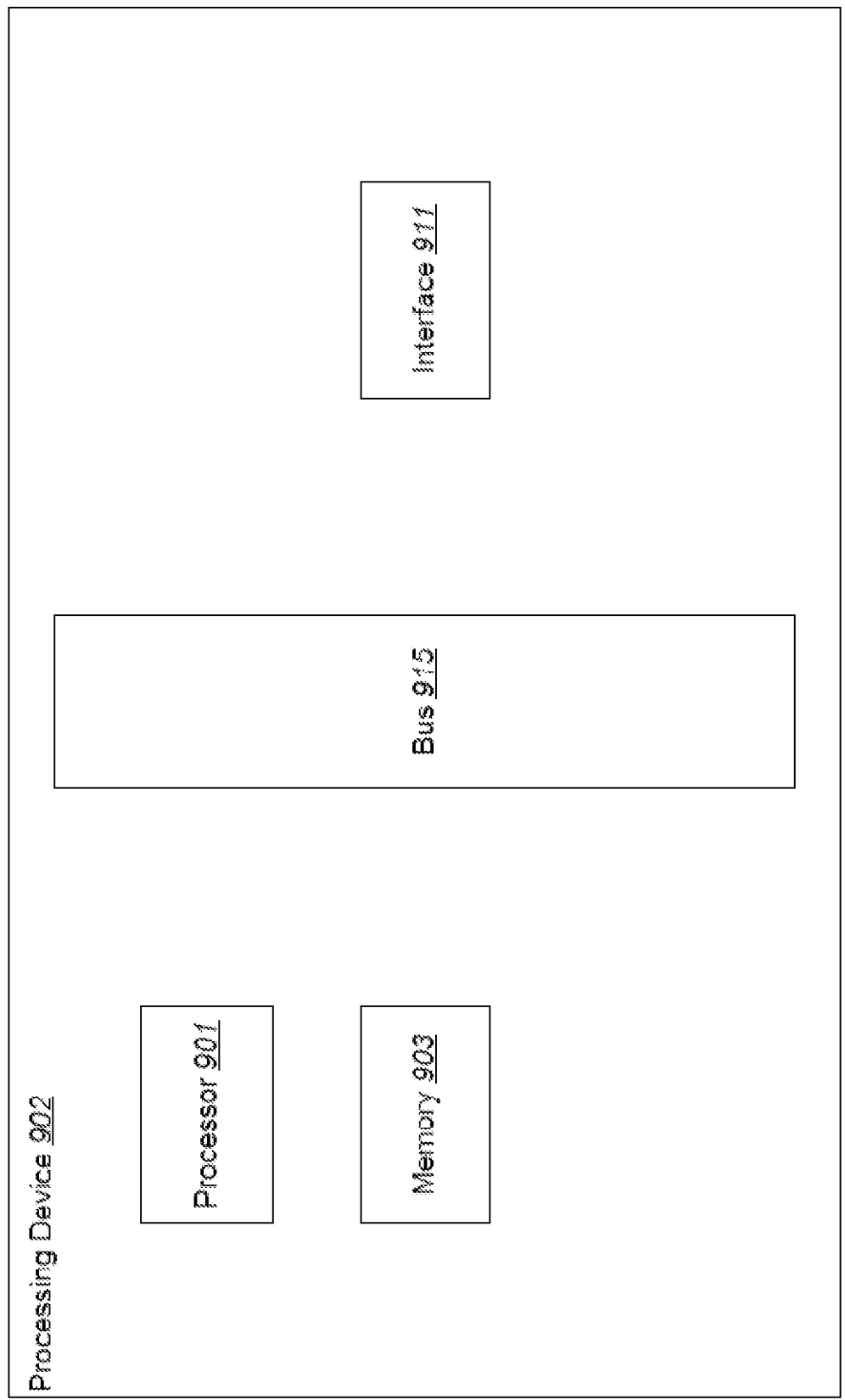
FIG. 9 illustrates an example of a computer system or a processing device that can be used with various embodiments.
Figure 10:
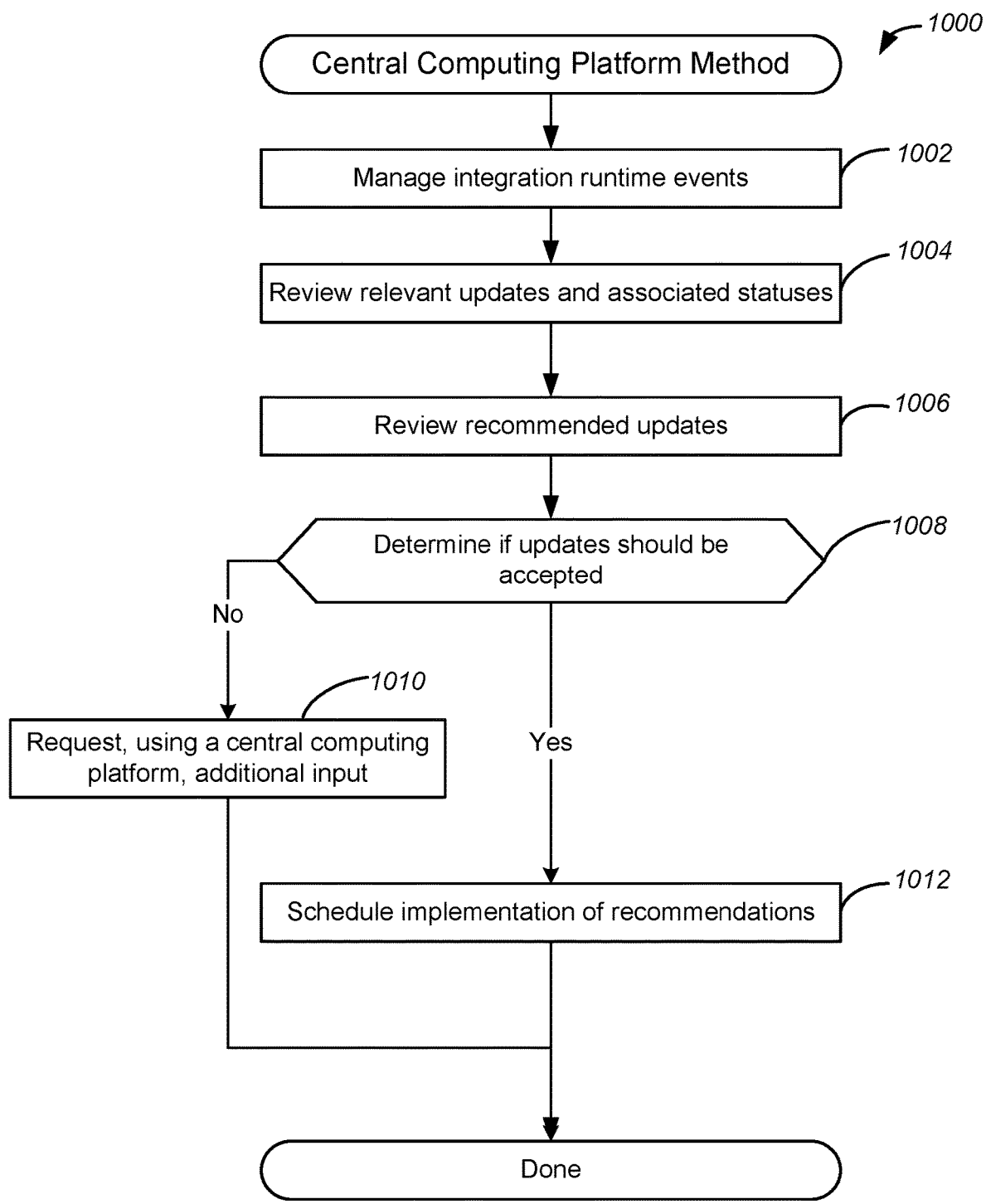
FIG. 10 an example of a flow chart of a method for implementing update events, implemented in accordance with some embodiments.
Figure 11:
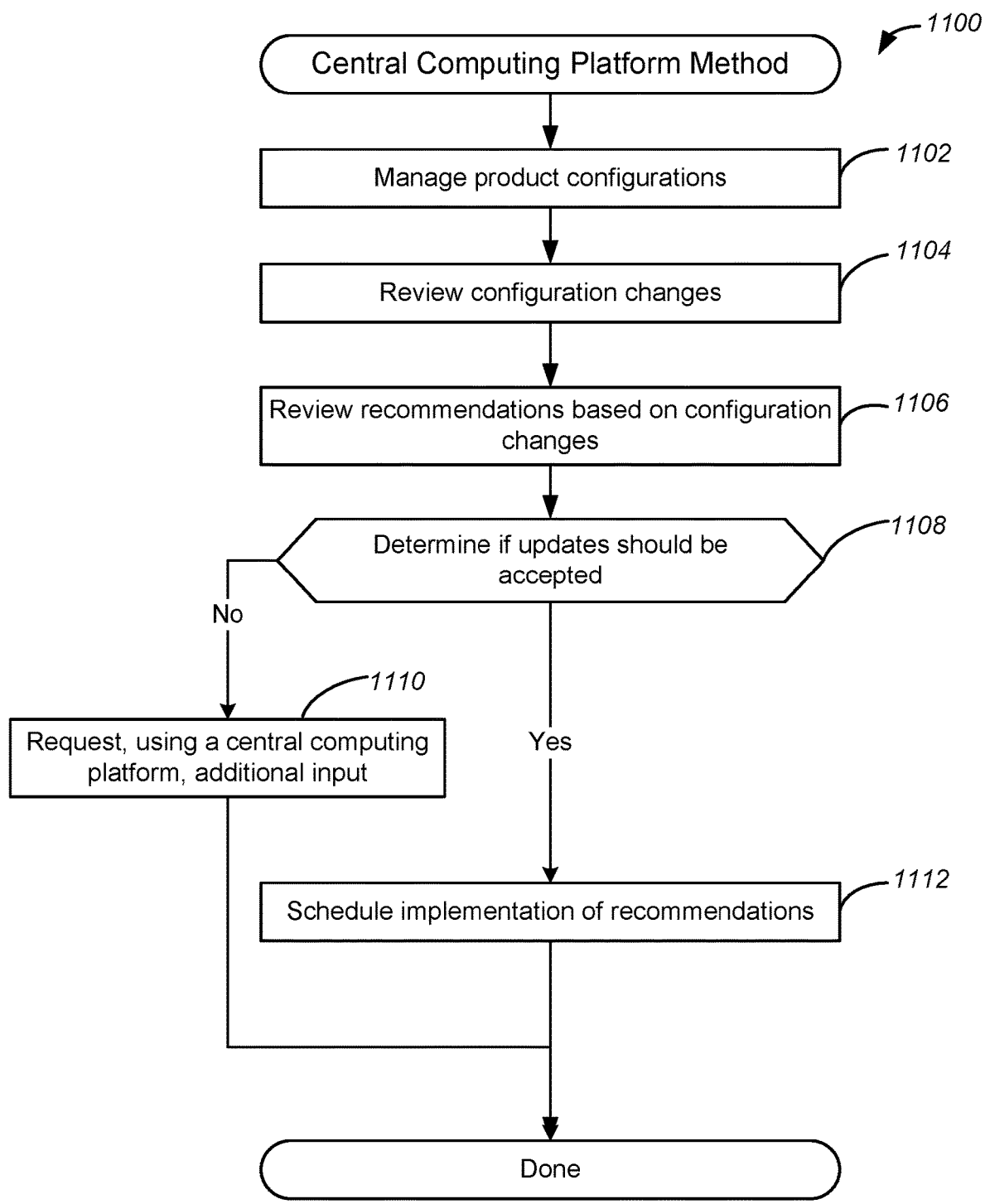
FIG. 11 an example of a flow chart of a method for implementing configuration events, implemented in accordance with some embodiments FIG. 12 an example of a flow chart of a method for implementing integration events, implemented in accordance with some embodiments.
Figure 12:
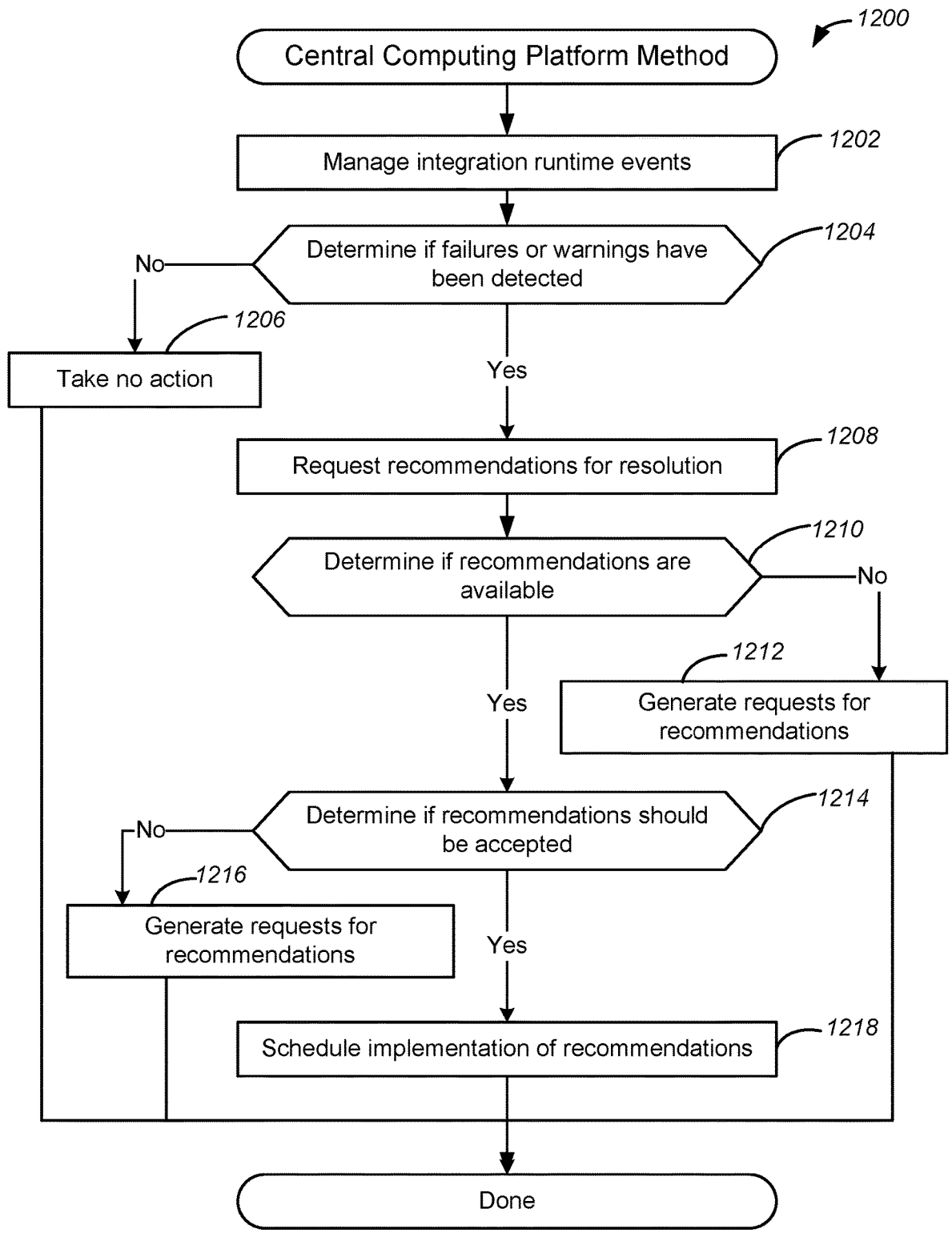

FIG. 9 illustrates an example of a computer system or a processing device that can be used with various embodiments. For instance, the processing device 902 can be used to implement central computing platform 102 in accordance with the various embodiments described above. Moreover, processing device 902 may be used to implement any of the customer portal interfaces or vendor portal interfaces discussed above, as well as recommendations engines and rules engines. Accordingly, each of these system components may be implemented utilizing a processing device, such as processing device 902.

In addition, the processing device 902 shown can represent a computing system on a mobile device or on a computer or laptop, etc. According to particular example embodiments, a processing device 902 suitable for implementing particular embodiments of the present invention includes a processor 901, a memory 903, an interface 911, and a bus 915 (e.g., a PCI bus). The interface 911 may include separate input and output interfaces, or may be a unified interface supporting both operations. When acting under the control of appropriate software or firmware, the processor 901 is responsible for tasks such as the product updates, product configurations, and product integrations described above. Various specially configured devices can also be used in place of a processor 901 or in addition to processor 901. The complete implementation can also be done in custom hardware. The interface 911 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the processing device 902 uses memory 903 to store data and program instructions and maintain a local side cache. The program instructions may control the operation of an operating system and/or one or more applications, for example. The memory or memories may also be configured to store received metadata and batch requested metadata. In some embodiments, the memory is a non-transitory computer readable medium, as will be discussed in greater detail below.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Additional Examples

Also disclosed herein are methods for managing product updates, implemented in accordance with some embodiments. As will be discussed in greater detail below, a method, such as method 1000, may be implemented to update an SaaS application based on inputs provided by a central computing platform, as described above.

Accordingly, method 1000 may begin with operation 1002 by managing SaaS product updates. Accordingly, a customer portal may initiate a process of trying to implement an update associated with an SaaS application, as may be indicated by various releases, updates, and/or alerts.

Method 1000 may proceed with operation 1004 by reviewing relevant updates that have been identified by the central computing platform. Accordingly, the central computing platform may identify the available updates, and may further filter and identify relevant updates based on or more parameters of the customer and one or more parameters of the vendor. In this way, updates provided to the customer portal are customized for that particular instance of the customer portal.

Method 1000 may proceed with operation 1006 by reviewing the recommended updates that have been provided by the central computing platform. Such review may be performed by a user or via intelligent automation. It may then be determined at operation 1008 if the recommendations should be accepted. If they are not accepted, additional follow up with the central computing platform may be requested at operation 1010. Such a request may be handled by the central computing platform, or may be referred to a consultant or subject matter expert. If they are accepted, at operation 1012 the identified recommended actions and associated characteristics, such as tasks/priory/etc., may be implemented by, for example, adding the actions to existing integration plans.

Additionally disclosed herein are methods for managing product configurations, implemented in accordance with some embodiments. As will be discussed in greater detail below, a method, such as method 1100 may be used to implement a configuration of an SaaS application based on inputs provided by a central computing platform, as described above.

Accordingly, method 1100 may begin with operation 1102 by managing SaaS product configurations. Accordingly, a customer portal may initiate a process of configuring an SaaS application. In various embodiments, the configuration of an SaaS application may include specific aspects of the integrations, as well as attributes, etc. of the SaaS application. For example, a change in a configuration may be a change in a particular application program interface (API) associated with the SaaS application.

The method may proceed with operation 1104 by reviewing configuration changes that have been identified by the central computing platform. Accordingly, the central computing platform may identify various configuration changes based on one or more changes made to other instances of the SaaS application. In this way, the central computing platform may identify configuration changes based on other similar portals. In some embodiments, such configuration changes are discovered by the central computing platform by running cron jobs. In this way, the configuration changes that are identified and provided to the customer portal may be identified based on data from multiple instances.

The method may proceed with operation 1106 by reviewing the recommended configuration changes that have been provided by the central computing platform. Such review may be performed by a user or via intelligent automation. It may then be determined at operation 1108 if the recommendations should be accepted. If they are not accepted, additional follow up with the central computing platform may be requested at operation 1110. Such a request may be handled by the central computing platform, or may be referred to a consultant or subject matter expert. If they are accepted, at operation 1112 the identified recommended changes may be implemented. For example, changes may be made to integrations, and their attributes may be updated.

Further disclosed herein are methods for managing product integration events, implemented in accordance with some embodiments. Thus, according to various embodiments, the central computing platform may facilitate and manage product integration events for various SaaS products and their associated customer portals.

In some embodiments, method 1200 may commence with operation 1202 by initiating the integration of runtime events in a production environment of an SaaS product. For example, a schedule of runtime events may be reviewed, and statuses associated with such runtime events may be identified and reviewed. If appropriate, the statuses of each event may be checked and reviewed.

The method may proceed to operation 1204 to determine if any of the statuses identify a failure or warning. If no failures or warnings are identified, no action is taken at operation 1206 and the method may terminate. However, if a failure or warning is identified, one or more recommendations may be requested from the central computing platform at operation 1208.

Accordingly, at operation 1210, it may be determined if recommendations are available. If recommendations are not available, one or more requests may be generated at operation 1212. For example, a request may be sent to a consultant or other entity to generate one, or one may be generated automatically. If recommendations are available, it may be determined at operation 1214 if the recommendations should be accepted. If it is determined that the recommendations should not be accepted, an additional input may be provided to the consultant or other entity, or may otherwise be handled by the central computing platform at operation 1216. If it is determined that the recommendations should be accepted, then the recommended tasks and associated priorities may be added to integration plans at operation 1218.

In various embodiments, one or more additional methods and/or functions may be implemented for the customer portal. For example, the central computing platform and customer portal may be configured to manage integrations in which it is possible to add/update/delete integrated systems and integrations as well as integration attributes.

In another example, the central computing platform and customer portal may be configured to manage integration plans in which it is possible to add/update/delete plan details, status, tasks and resources, dependencies, start and end dates, etc., and make use of a mini-project management tool available within a customer portal, such as that provided by SimplrOps Inc., to manage integration plans.

In yet another example, the central computing platform and customer portal may be configured to implement administrative management which may include customer profile and environment management where a customer can connect to multiple tenants of an SaaS product via the central computing platform (e.g. production, implementation, etc.), and may also include user and resources management.

In an additional example, the central computing platform and customer portal may be configured to implement requests and notifications in which customers can communicate with a team, such as a SimplrOps team, by creating requests, the team can send responses to the requests in the form of notifications, and ad-hoc messaging is provided to the customers (e.g. a new release is available) in the form of notifications as well.

In various embodiments, customer portals, as well as other components, may be configured to manage integrations, security groups, business rules, etc. For example, they may be configured to add/update/delete/print, manage versions, and compare data between two or more tenants. In some embodiments, they may be configured to manage plans via a mini-project management tool within SimplrOps. For example, they may be configured to add/update/delete plan details, status, tasks and resources, dependencies, start and end dates, etc. In some embodiments, they may be configured to handle requests and notifications. For example, they may be configured to enable customers to communicate with SimplrOps team by creating requests, enable SimplrOps team to send responses to the requests in form of notifications, and enable ad-hoc messaging to the customers (e.g. a new release is available) sent in the form of notifications as well.

In various embodiments, one or more additional methods and/or functions may be implemented for the central computing platform. For example, the central computing platform may be configured to manage customer data such that it is possible to add/update/delete customer profiles.

In another example, the central computing platform may be configured to manage vendor product updates, such as SaaS product updates, such that it is possible to load planned updates, service updates, and ad-hoc customer alerts for an SaaS Product, figure out, by automation, if the updates are relevant to a particular customer or not, and categorize each update as relevant or non-relevant to a customer.

In yet another example, the central computing platform may be configured to manage recommendations for each relevant update such that it is possible to create/update recommendations for each relevant update, and review recommendations that are published to required customer(s). Such review may be performed by a consultant, subject matter expert, or based on intelligent automation.

In an additional example, the central computing platform may be configured to generate notifications such that it is possible to enable customers to communicate with a team associated with the central computing platform, such as a SimplrOps Inc. team, by creating requests in a customer portal, having the team send responses to the requests in the form of notifications, and implementing ad-hoc messaging to the customers (e.g. a new release is available) that are sent in form of notifications as well.

In various embodiments, additional functionalities may include managing functional updates for a customer (e.g. manage updates to HCM, etc. for customers using Workday). Additional functionalities may also include allowing management of multiple SaaS products for a single customer. In this way, the management of such products may be expanded by loading the updates for multiple SaaS Products and its updates in the central computing platform.

In various embodiments, SimplrOps is enhanced and configured to support more Workday products/modules besides various implementation disclosed herein, and is not limited to HCM, Compensation, Payroll, Finance and more. Moreover, the SimplrOps framework has been configured such that in future it can support other SaaS products besides Workday. E.g. Products—Cornerstone, ADP, SABA, Salesforce. SimplrOps is configured to retrieve customer configuration for such products, and manage their post-implementation state via SimplrOps. In various embodiments, SimplrOps is configured to provide services, training and support packages besides allowing subscription to SimplrOps Product. In some embodiments, it is configured to manage functional updates for a Customer (e.g. manage updates to HCM, etc for customers using Workday). It is also configured to allow management of multiple SaaS products for a single customer. In this way, functionalities may be expanded by loading the updates for multiple SaaS Products and its updates in SimplrOps.

In various embodiments, a rules engine may be configured to enable a platform as disclosed herein, such as the SimplrOps platform, to give customers the ability to define repeatable conditions that will automatically launch when the platform finds system configuration changes in third party SaaS applications that meet one or more criteria defined and/or identified by the rules engine. In this way, automatic implementations of one or more operations described above may be configured based on inputs received from users, such as customers, as well as based on one or more artificial intelligence determinations. In various embodiments, a platform, such as the SimplrOps platform, may be implemented as a SaaS operation management platform.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method comprising:

retrieving, using one or more processors of a central computing platform, one or more update data objects identifying one or more updates to a distributed application;

identifying, using the one or more processors, a configuration of a customer portal interface configured to provide an application program interface (API) communicatively coupled to a vendor portal interface associated with the distributed application, the customer portal interface comprising a first API provided to first users of the distributed application and being configured based on current configuration data, the vendor portal interface comprising a second API provided to second users of the distributed application;

retrieving, using the one or more processors, the current configuration data associated with the customer portal interface, the current configuration data characterizing a configuration and settings of the first API particular to an instance of the distributed application accessed by the customer portal interface; and generating, using the one or more processors, one or more custom input data objects based, at least in part, on the one or more updates and the current configuration data such that the one or more custom input data objects are configured based, at least in part, on the instance associated with the customer portal interface, the custom input data objects being capable of receiving an input identifying a user-defined change to the current configuration data for the customer portal interface.

2. The method of claim 1, wherein the central computing platform is communicatively coupled to the vendor portal interface, and wherein the customer portal interface is communicatively coupled to the vendor portal interface via the central computing platform.

3. The method of claim 2, wherein the customer portal interface comprises a web-accessible API associated with a first computing environment, and wherein the vendor portal interface comprises a web-accessible API associated with a second computing environment.

4. The method of claim 1 further comprising:
generating one or more recommendation data objects based, at least in part, on the identified customer portal interface configuration.

5. The method of claim 4 further comprising:
generating one or more notifications based, at least in part, on the one or more recommendation data objects.

6. The method of claim 5, wherein the one or more notifications are messages sent via the customer portal interface.

7. The method of claim 1 further comprising:
receiving an input via the custom input data object, wherein the custom input data object comprises a custom user interface element.

8. The method of claim 1 further comprising:
validating the current configuration data based, at least in part, on a configuration of one or more validation rules.

9. The method of claim 1 further comprising:
comparing the current configuration data against additional configuration data.

10. A central computing platform comprising one or more processors configured to perform a method, the method comprising:
retrieving one or more update data objects identifying one or more updates to a distributed application;
identifying a configuration of a customer portal interface configured to provide an application program interface (API) communicatively coupled to a vendor portal interface associated with the distributed application, the customer portal interface comprising a first API provided to first users of the distributed application and being configured based on current configuration data, the vendor portal interface comprising a second API provided to second users of the distributed application;
retrieving current the configuration data associated with the customer portal interface, the current configuration data characterizing a configuration and settings of the first API particular to an instance of application data the distributed application accessed by the customer portal interface; and
generating one or more custom input data objects based, at least in part, on the one or more updates and the current configuration data such that the one or more custom input data objects are configured based, at least in part, on the instance associated with the customer portal interface, the custom input data objects being capable of receiving an input identifying a user-defined change to the current configuration data.

11. The central computing platform recited in claim 10, wherein the central computing platform is communicatively coupled to the vendor portal interface, and wherein the customer portal interface is communicatively coupled to the vendor portal interface via the central computing platform.

12. The central computing platform recited in claim 11, wherein the customer portal interface comprises a web-accessible API associated with a first computing environment, and wherein the vendor portal interface comprises a web-accessible API associated with a second computing environment.

13. The central computing platform recited in claim 10, wherein the central computing platform is configured to:
generate one or more recommendation data objects based, at least in part, on the identified customer portal interface configuration.

14. The central computing platform recited in claim 13, wherein the central computing platform is configured to:
generating one or more notifications based, at least in part, on the one or more recommendation data objects, wherein the one or more notifications are messages sent via the customer portal interface.

15. The central computing platform recited in claim 10, wherein the central computing platform is configured to:
receive an input via the custom input data object, wherein the custom input data object comprises a custom user interface element.

16. The central computing platform recited in claim 10, wherein the central computing platform is configured to:
validate the current configuration data based, at least in part, on a configuration of one or more validation rules.

17. The central computing platform recited in claim 10, wherein the central computing platform is configured to:
compare the current configuration data against additional configuration data.

18. One or more non-transitory computer readable media having instructions stored thereon for performing a method, the method comprising:
retrieving, using one or more processors of a central computing platform, one or more update data objects identifying one or more updates to a distributed application;
identifying, using the one or more processors, a configuration of a customer portal interface configured to provide an application program interface (API) communicatively coupled to a vendor portal interface associated with the distributed application, the customer portal interface comprising a first API provided to first users of the distributed application and being configured based on current configuration data, the vendor portal interface comprising a second API provided to second users of the distributed application;
retrieving, using the one or more processors, the current configuration data associated with the customer portal interface, the current configuration data characterizing a configuration and settings of the first API particular to an instance of the distributed application accessed by the customer portal interface; and
generating, using the one or more processors, one or more custom input data objects based, at least in part, on the one or more updates and the current configuration data such that the one or more custom input data objects are configured based, at least in part, on the instance associated with the customer portal interface, the custom input data objects being capable of receiving an input identifying a user-defined change to the current configuration data for the customer portal interface.

19. The one or more non-transitory computer readable media recited in claim 18, wherein the central computing platform is communicatively coupled to the vendor portal interface, and wherein the customer portal interface is communicatively coupled to the vendor portal interface via the central computing platform.

20. The one or more non-transitory computer readable media recited in claim 19, wherein the customer portal interface comprises a web-accessible API associated with a first computing environment, and wherein the vendor portal interface comprises a web-accessible API associated with a second computing environment.

* * * * *